(12) United States Patent
Hirasawa

(10) Patent No.: US 6,250,552 B1
(45) Date of Patent: *Jun. 26, 2001

(54) CARD READER HAVING MEANS FOR REDUCING THE SIZE OF THE CARD READER

(75) Inventor: Kenji Hirasawa, Nagano (JP)

(73) Assignee: Sankyo Seiki Mfg. Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,038

(22) Filed: Nov. 13, 1997

(30) Foreign Application Priority Data

Nov. 15, 1996 (JP) .................................................. 8-304637
Nov. 22, 1996 (JP) .................................................. 8-312250
Mar. 4, 1997 (JP) .................................................. 9-049342

(51) Int. Cl.[7] .................................................. G06K 13/00
(52) U.S. Cl. .......................... 235/475; 235/449; 235/477
(58) Field of Search .................................. 235/449, 439, 235/441, 451, 475, 477, 492, 493, 486, 453

(56) References Cited

U.S. PATENT DOCUMENTS

| | | | |
|---|---|---|---|
| 5,010,239 | * | 4/1991 | Mita ..................................... 235/441 |
| 5,045,674 | * | 9/1991 | Mita et al. ........................... 235/439 |
| 5,051,566 | * | 9/1991 | Pernet .................................. 235/441 |
| 5,065,004 | * | 11/1991 | Mizuno et al. ..................... 235/479 |
| 5,331,138 | * | 7/1994 | Saroya ................................ 235/449 |
| 5,362,951 | * | 11/1994 | Kanazawa et al. ................. 235/449 |
| 5,546,242 | * | 8/1996 | Miller ................................. 235/449 |
| 5,594,233 | * | 1/1997 | Kenneth et al. ..................... 235/492 |
| 5,698,832 | * | 12/1997 | Someya .............................. 235/449 |
| 5,821,515 | * | 10/1998 | Kitahara ............................. 235/441 |
| 5,920,055 | * | 7/1999 | Roth et al. .......................... 235/380 |

* cited by examiner

*Primary Examiner*—Karl D. Frech
*Assistant Examiner*—Daniel St. Cyr
(74) *Attorney, Agent, or Firm*—Reed Smith LLP

(57) ABSTRACT

A card reader includes a card insertion slot through which a card is inserted, a card transferring device which transfers the inserted card from the insertion slot along a card driving path, and a reading device along one point of the path for reading data stored on the card. The card may be a magnetic card or an IC card having an IC terminal thereon. The card reader also includes a pressing mechanism disposed between the card insertion slot and the reading device which presses against one edge of the card so that the opposite edge of the card is pressed against a card driving reference plane. The card reader also may include an IC contact block for making contact with the IC terminal on an inserted IC card, and a contact block moving device which moves the IC contact block towards and away from the IC card, and wherein both the card transferring device and the contact block moving device are driven by the same motor, and differences in load torque is utilized therebetween to determine how the drive force is distributed. The card reader further may include a biasing mechanism that forces two opposing read heads towards one another, and a movement limiting mechanism limits movement of the read heads in a particular manner such that the read heads are forced to a neutral, central position when a card is not inserted in the card reader.

19 Claims, 14 Drawing Sheets

CARD READER HAVING MEANS FOR REDUCING THE SIZE OF THE CARD READER

BACKGROUND OF THE INVENTION a) Field of the Invention

The present invention relates to a card reader which handles a magnetic card or an IC card and the like.

b) Description of the Related Art

In a conventional card reader, an IC or magnetic card on which data are stored is held in the thickness direction by a pair of rollers, at least one of which is driven by a motor and the like, thereby transferring the card to the driving path. In the magnetic card reader which is disclosed in Japanese Patent Laid Open No. H5-12498, for example, a magnetic card is held by three pairs of rollers arranged in the driving direction thereby transferring the magnetic card. When data recording/reproduction is performed, a magnetic strip formed on the magnetic card is moved with respect to the magnetic head. In a card reader, the size of a card insertion slot is somewhat larger than the card, therefore, the card is not always inserted straight. To resolve the problem in a card reader of the conventional technology, the distance by which the card is transferred is set long such that the magnetic card which is inserted at a slanted angle or in an askew manner is straightened before it reaches the magnetic head. However, providing a long path is undesirable as it prevents the production of reduced-size card readers.

When using a magnetic card in the card reader, one or both sides of the card normally is formed with a magnetic strip. The magnetic information on the magnetic strip is recorded/reproduced by the magnetic heads formed opposite each other across the card driving path. With the magnetic heads on the sides of the driving path, each of the magnetic heads are designed to be pressed by a compression coil spring such that the magnetic heads are projected to transfer the force to a magnetic card. However, if a warped card is driven, the magnetic head deviates from the base position due to the warping of the card. Upon removal of the card, the head deviation is maintained. If a magnetic card is inserted into a slot while the magnetic head is deviated from its original position, the end of the card contacts a side of the magnetic head, thereby affecting the smooth driving of the card.

In addition, current card readers may be used to read both magnetic cards and IC cards. When recording to or reading from an IC card, the IC terminal formed on one side of the card is contacted by the card reader, and the IC contact block of the card reader is moved by means of a specific actuator (solenoid). However, a mechanism, independent from the driving mechanism for transferring the IC card, to drive the IC contact block is required, thus increasing the number of components, cost and size of the card reader. Also, when the IC contact block is designed to be lowered along with the card movement, the load during the IC card transfer increases, thus causing the card to jam. Further, a card reader may be designed such that the magnetic head is given the capability to record/reproduce magnetic data, and if the IC contact block is lowered during such recording/reproducing, data recording/reproduction may be degraded.

OBJECTS OF THE INVENTION

Therefore, it is an object of the present invention to provide a card reader which can be reduced in size by reducing the distance over which the card is transferred.

Another object of the present invention is to provide a card reader which can read a warped card.

A further object of the present invention is to provide a card reader, when an IC card is handled by the above card reader, the overall card reader can be made compact by driving a card transfer means and an IC contact transfer means by a single motor.**

SUMMARY OF THE INVENTION

In accordance with one embodiment of the present invention, a card reader is comprised of a card insertion slot through which a card is inserted, a card transferring device which transfers the inserted card from the insertion slot along a card driving path to a reading device (e.g., a magnetic head), and pressing means disposed between the card insertion slot and the reading device for pressing against one edge of the card so that the opposite edge of the card is pressed against a card driving reference plane.

As an aspect of the invention, when an IC card having an IC terminal is inserted in the card reader, an IC contact block is provided to make contact with the IC terminal so that the data stored in the IC card can be read therefrom. The card reader further includes a contact block moving device which moves the IC contact block towards and away from the IC card, and wherein a load torque required to move the IC contact block to contacting position (with the IC card) is set larger than a load torque required for transferring the IC card by the card transfer means; and is set smaller than a load torque required for transferring the IC card when the position of the IC card is limited. The card reader further comprises a driving force switching mechanism for switching a rotational force of the motor to either the card transfer means or the contact block moving device depending on which device has the smaller load torque.

In accordance with another embodiment of the present invention, the card reader is comprised of a card insertion slot through which a card is inserted, a card transferring device which transfers the inserted card from the insertion slot along a card driving path, a magnetic head located above a read position for reading data stored on a magnetic strip of the card, bias means for biasing the magnetic head in a direction towards the surface of the card, and head movement limiting means for establishing a predetermined minimum distance of the magnetic head above the card driving path when the card is not located at the read position, and the head movement limiting means does not establish the predetermined minimum distance when the card is located at the read position.

As an aspect of this embodiment, two opposing magnetic heads are provided for reading magnetic strips located on opposite sides of the card, and a second bias means is provided for biasing the second magnetic head towards the card such that the first and second bias means provide biases in opposite directions towards one another, and the head movement limiting means forces the first and second magnetic heads into respective neutral positions above and below the card driving path only when the card is not located at the read position.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts.

DETAILED DESCRIPTION OF THE PREFERRED EMBODIMENTS

Figure 1:
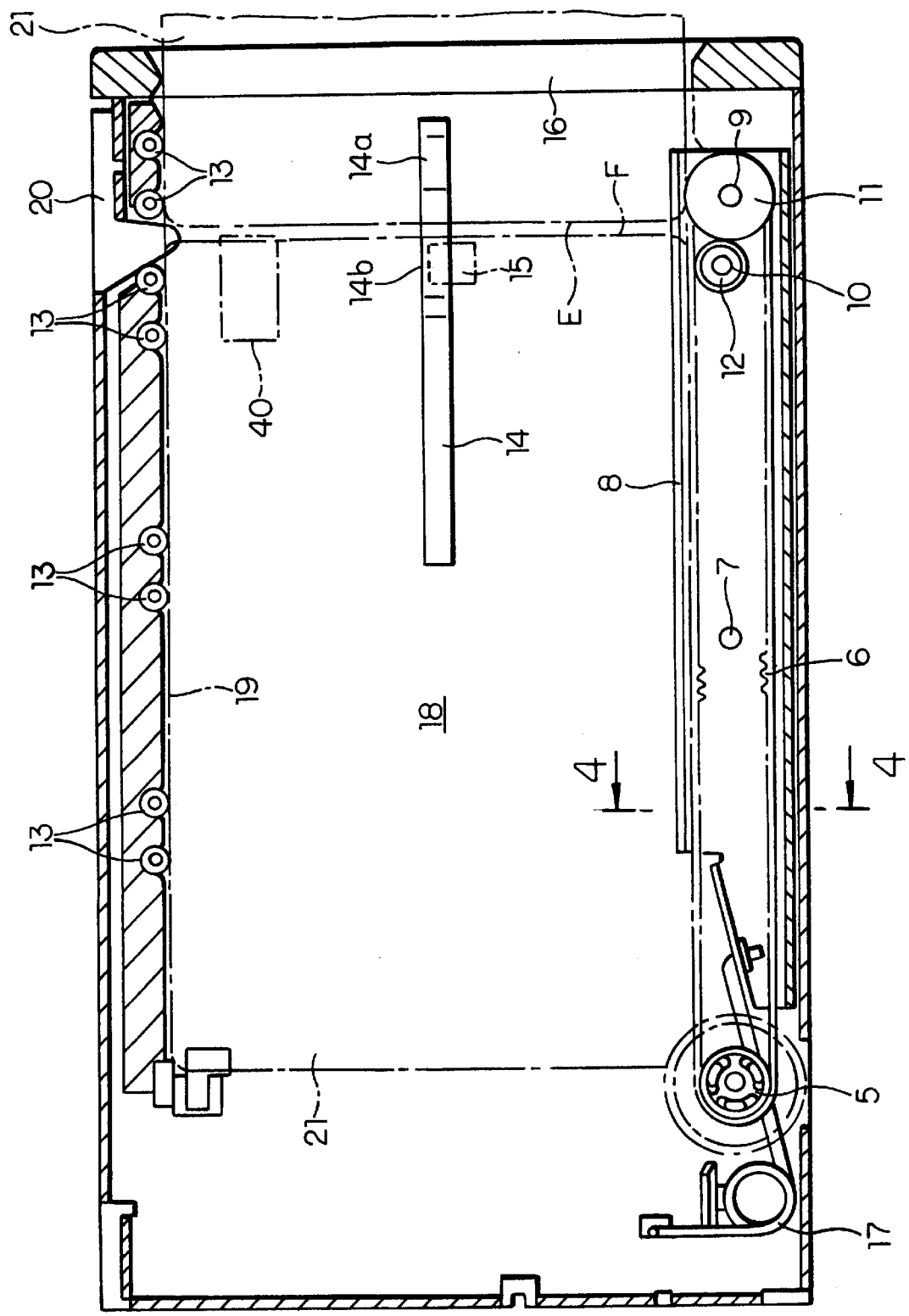
FIG. 1 is a plan cross section showing a card transfer mechanism of a card reader of the present invention.
Figure 2:
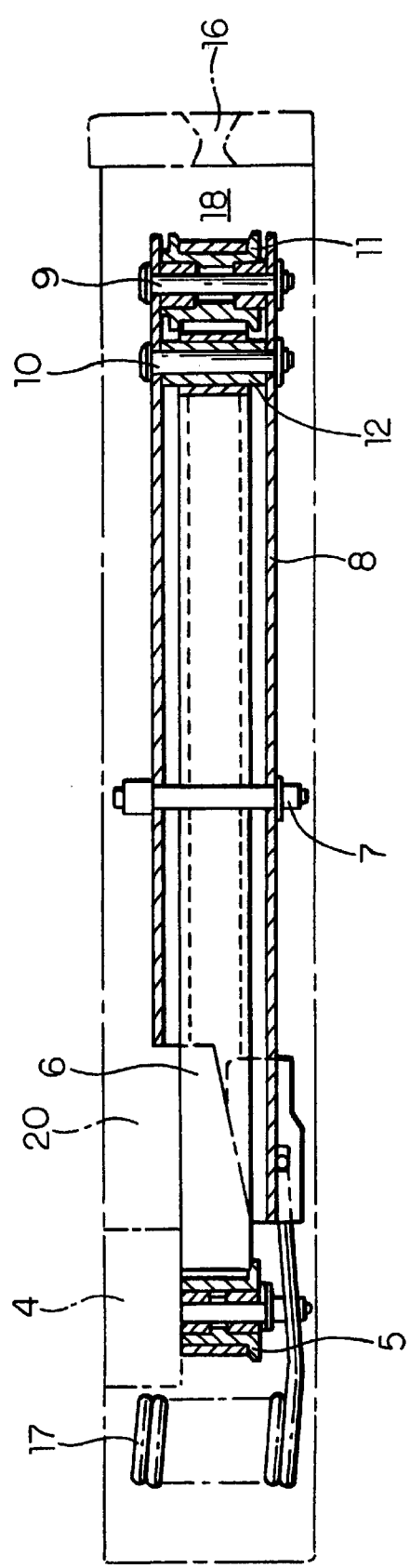
FIG. 2 is a vertical cross section detailing the card pressure mechanism of the card reader shown in FIG. 1.
Figure 3:
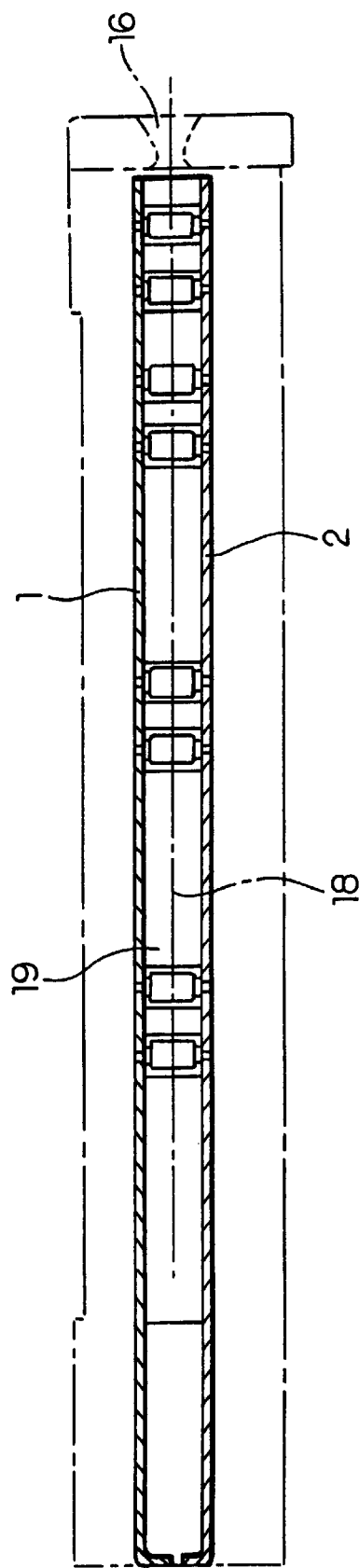
FIG. 3 is a vertical cross section showing a card driving reference plane of the card reader shown in FIG. 1.

Referring now to the drawings, FIGS. 1–3 show embodiments of the card reader of the present invention. The card reader in these embodiments is for a magnetic card, which is driven by a motor to transfer the magnetic card inserted from the card insertion slot to record/reproduce data on the magnetic card by means of a magnetic head. The magnetic head can be reproduction specific or capable of both recording and reproducing.

Case 20 of the card reader is mounted with upper guiding frame 1 and lower guiding frame 2 (FIG. 3) which are made of a composite comprising sheet metal and molded. Card driving path 18 and driving reference plane 19 are formed in case 20. Magnetic head 40 is arranged in the middle of card driving path 18. The support mechanism and the like for this magnetic head 40 are described herein.

A pressing member in accordance with the present invention is located between card insertion slot 16 on case 20 and magnetic head 40, such pressing member contacting the side surface of card 21 so that card 21 presses against driving reference plane 19. In the disclosed embodiment, the pressing member is rotating member driven by, for example, driving motor 3 (See FIG. 15) which starts driving upon insertion of card 21. As shown in FIG. 1, the pressing member is a flat surface of belt 6 with teeth. Belt 6 is held between transmission pulley 11 with gear, which is arranged between card insertion slot 16 and magnetic head 40 to press the side surface of card 21 against the driving reference plane 19 side. Card 21 is transferred on the flat surface of belt 6, thereby providing a card transfer means, and driving pulley 5 with a gear, which is rotatably driven by driving motor 3.

Figure 4:
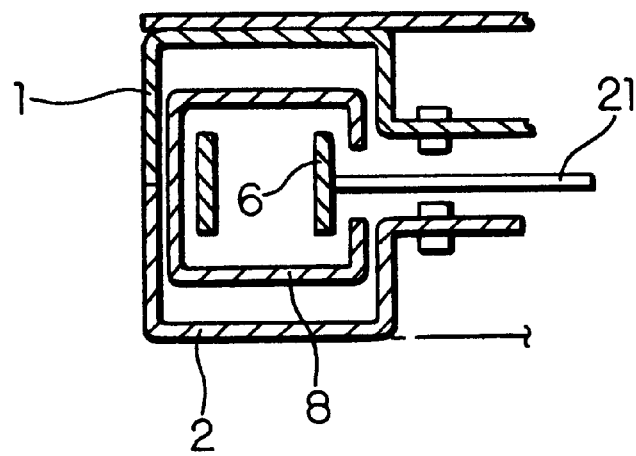
FIG. 4 is a IV—IV cross section of a card reader shown in FIG. 1.

Transmission pulley 11 is rotatably supported by shaft 9 at the end of pulley support arm 8 which is rotatably supported by shaft 7. Driving pulley 5 is positioned in the vicinity of the base of pulley support arm 8 and movably mounted on case 20. Between transmission pulley 11 and driving pulley 5, transfer pulley 12 with teeth, which transfer card 21 via belt 6 with teeth, is formed such that transfer pulley 12 dependently rotates via the teeth on belt 6 to press the side surface of card 21 with the flat surface of belt 6 with teeth against the card driving reference plane 19 side. That is, transfer pulley 12, arranged in the vicinity of transmission pulley 11, is rotatably supported by shaft 10, which is mounted onto pulley support arm 8. Because belt 6 is engaged with each of the pulleys 5, 11, and 12 with its teeth, which prevents the pulleys from slipping on the belt when motor driving force is transmitted. Also, the horizontal cross section of pulley support arm 8 is shaped in a square with an open side as shown in FIG. 4. Belt 6 is arranged inside the pulley support arm 8.

Figure 5:
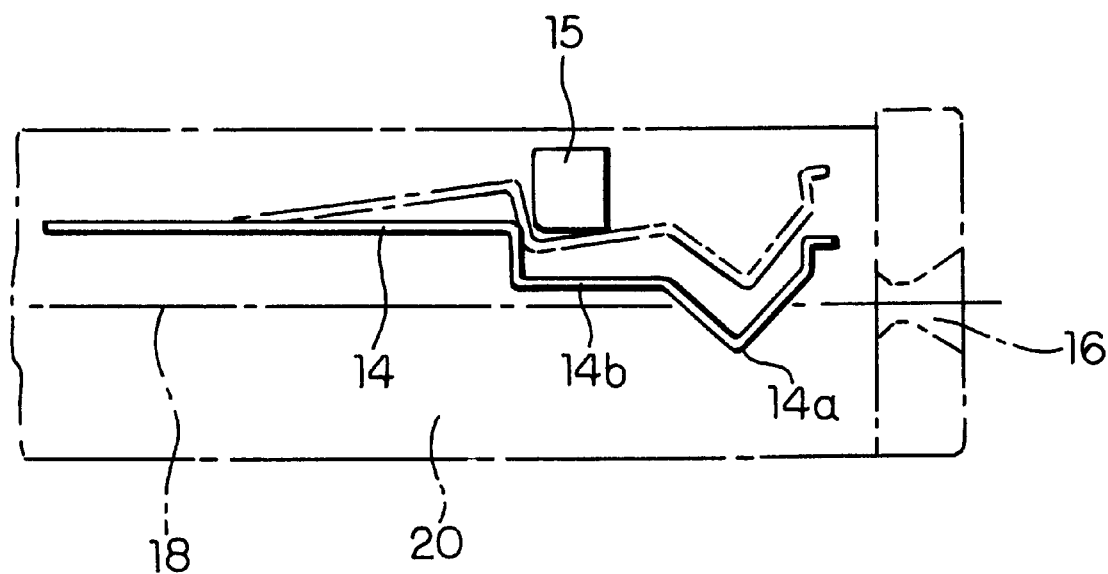
FIG. 5 is a diagram showing a positional relationship between the optical sensor and plate spring of the card reader shown in FIG. 1.

As shown in FIG. 5, card 21 is inserted to the slot and plate spring 14 is lifted up, when photo sensor 15 detects the deformation, thereby moving motor 3. Plate spring 14 is fixed onto upper guiding frame 1. Projection 14a is projected over card driving pass 18. When card 21 is inserted into the slot, photo sensor 15 is actuated. Belt 6 is moved as driving pulley 5 is rotated via a deceleration gear train (described later) by the driving force of motor 3. Card 21 is further taken in the driving direction on belt 6 as driving pulley 5 is rotated via deceleration gear train (described later) by the driving force of motor 3. Coil spring 17 is mounted on the base end of pulley support arm 8. One end of coil spring 17 is mounted on the case 20 side; the other end is mounted on the base end of pulley support arm 8. Coil spring 17 rotates pulley support arm 8 counterclockwise, in FIG. 1, around shaft 7 so that each of pulleys 11, 12 are projected over card driving path 18, that is, transmit the force to press the side of card 21 to each of pulleys 11, 12;

as a result, the driving force of belt 6 is transmitted to the left surface (FIG. 1, lower side surface) of card 21. Card driving reference plane 19 comprises a plurality of rotatable rollers 13. In other words, card driving reference plane 19 is structured such that (the outer surface of ) rotatable rollers 13 is slightly projected from a surface formed by a side mold portion of each of guiding frames 1, 2.

How the card reader operates card driving is described. When card 21 is inserted into card insertion slot 16, card 21 contacts projection 14a of plate spring 14 to push up actuator 14b of a photo sensor. When photo sensor 15 detects the movement of actuator 14b, motor 3 is activated to rotate belt 6 counterclockwise, as shown in FIG. 1, via a deceleration gear train and pulley 5; that is, to rotate belt 6 in the direction in which card 21 is taken into the card reader. When card 21 is inserted via card insertion as far as where pulley 11 is, card 21 is taken into the card reader by the driving force from belt 6.

When the tip of card 21 taken into the card reader reaches point E indicated with the double dotted line in FIG. 1, card 21 is positioned nearly parallel with card driving reference plane 19 by two pairs of rollers 13 on card insertion slot 16 side and pulley 11, and are taken into the card reader straight to magnetic head 40. When the magnetic strip on card 21 touches magnetic head 40, the magnetic head reads/writes the data on the magnetic strip. Transfer pulley 12 is arranged such that it projects slightly more than transmission pulley 11, thereby pulley 12 acts as the main feeder for the card transfer on belt 6 during the read/write mode of magnetic head 40. Instead of slightly more projecting transfer pulley 12 than transmission pulley 11, pulleys 11, 12 may be arranged in parallel in the card transfer direction.

When the read/write mode of head 40 is completed, card 21 at point F indicated with double dotted line in FIG. 1, card 21 is displaced from pulley 11. Card 21 is pressed against card driving reference plane 19 side only with pulley 12. Then, motor 3 is driven reversely to eject card 21 by rotating belt 6 clockwise as shown in FIG. 1.

In the above embodiment, the rotational force of motor 3 is transmitted to drive pulley 5 to rotate belt 6, thus each of the pulleys 11, 12 are rotated. However, pulley 11 or pulley 12 may be rotated directly by motor 3. Also, in the above embodiment, a plurality of rollers 13 are provided on card driving reference plane 19 to construct a row of rollers. The row of rollers may be replaced with a belt which moves as a card is driven. In addition, each roller 13 may be omitted and a mold surface may contact a card.

The magnetic head support mechanism in accordance with the present invention will now be described. Referring to FIGS. 6–11, card 21 is pushed in the card reader such that it projects within card driving path 18. At the same time, the card reader includes magnetic heads 40, 50, which are supported such that they can move in the direction orthogonal to the card surface which conforms to the waves/warps of card 21, and a limiting lever, which acts as a limiting member in accordance with the present invention.

Limiting lever 36 is positioned at the limited position (indicated with a solid line in FIG. 6) at which the amount of projection of the magnetic heads 40, 50 over card driving path 18 when card 21 is ejected to the outside of the card reader and does not contact magnetic heads 40, 50. Limiting lever 36 retreats from the limited position (see double dotted line in FIG. 6) when card 21 is inserted into the card reader and contacts magnetic heads 40, 50.

Figure 7:
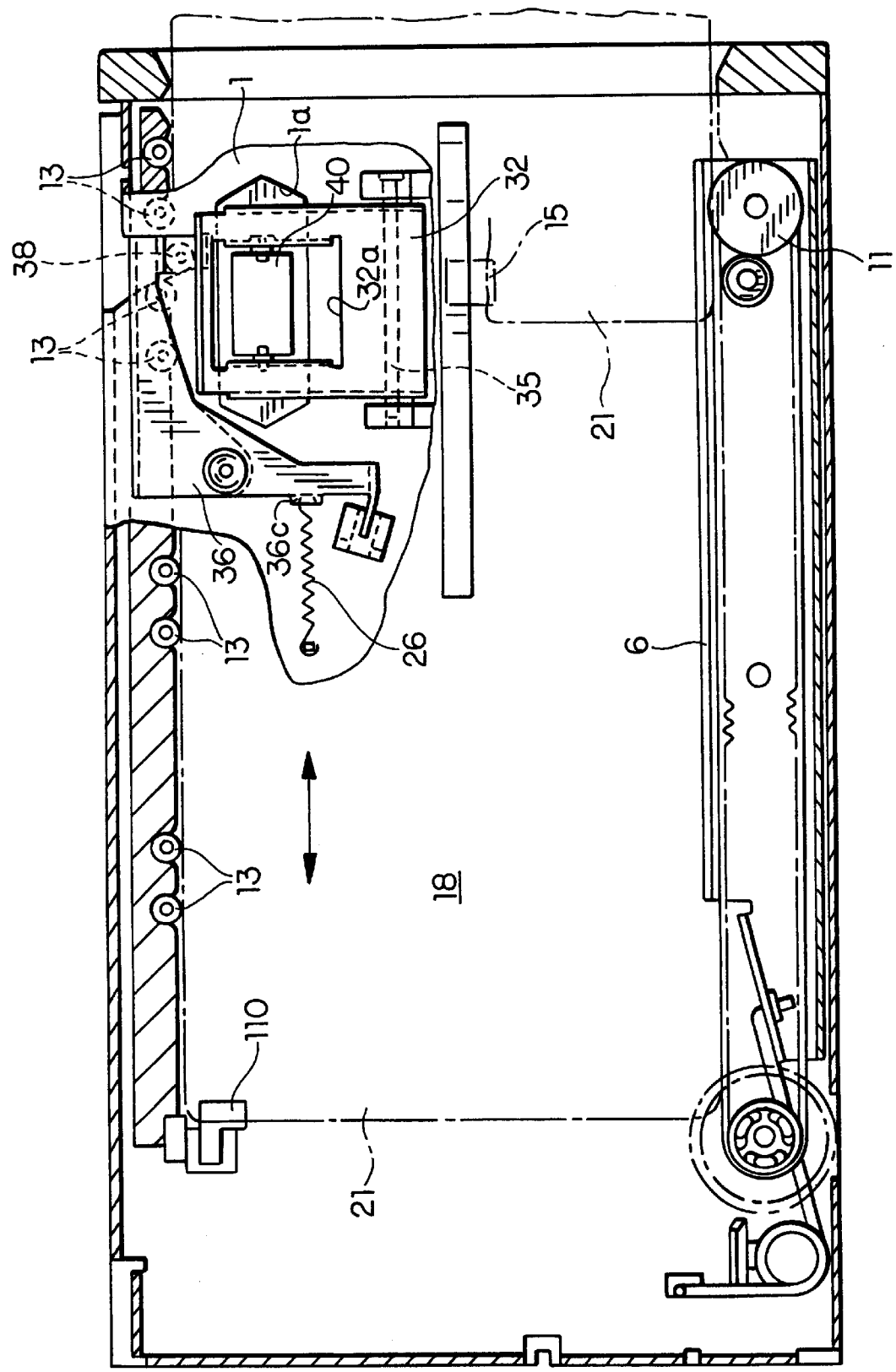
FIG. 7 is a plan cross section showing the overall card reader shown in FIG. 6.
Figure 8:
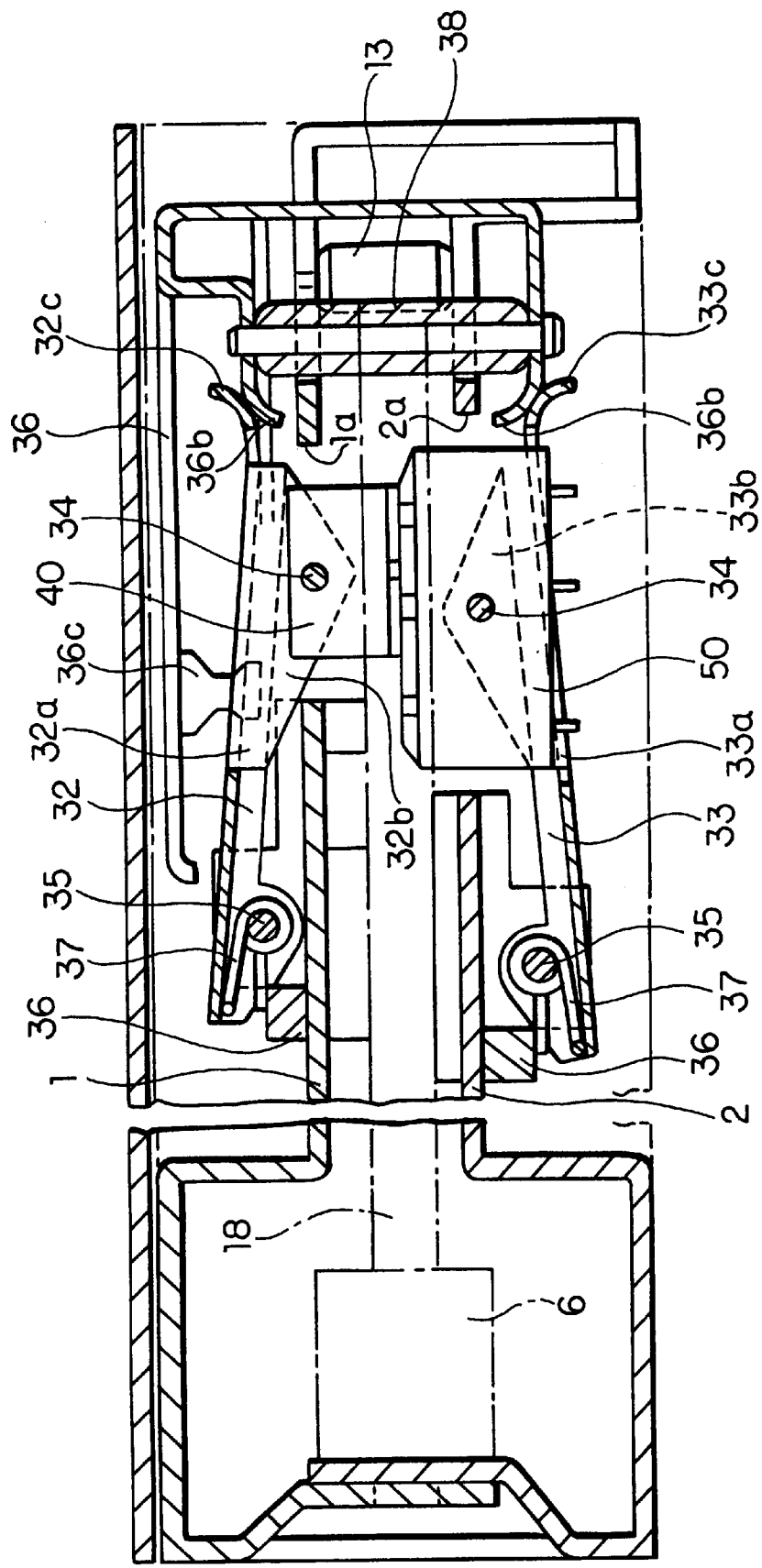
FIG. 8 is a vertical cross section showing a head support mechanism cut out at III—III shown in FIG. 6.

The card reader, as shown in FIGS. 7 and 8, includes upper and lower guiding frames 1 and 2 which form card driving path 18, magnetic heads 40, 50, which are formed on the sides of the direction perpendicular to the card surface on card driving path 18, a card feeding mechanism by means of belt 6 arranged along one end of card driving path 18, and an insertion detecting sensor 110, which detects the fact that card 2 is inserted into the end of the slot.

Head windows 1a, 2a are formed on upper and lower guiding frames 1, 2 where magnetic heads are arranged such that magnetic heads 40, 50 can be exposed to card driving path 18.

Figure 9:
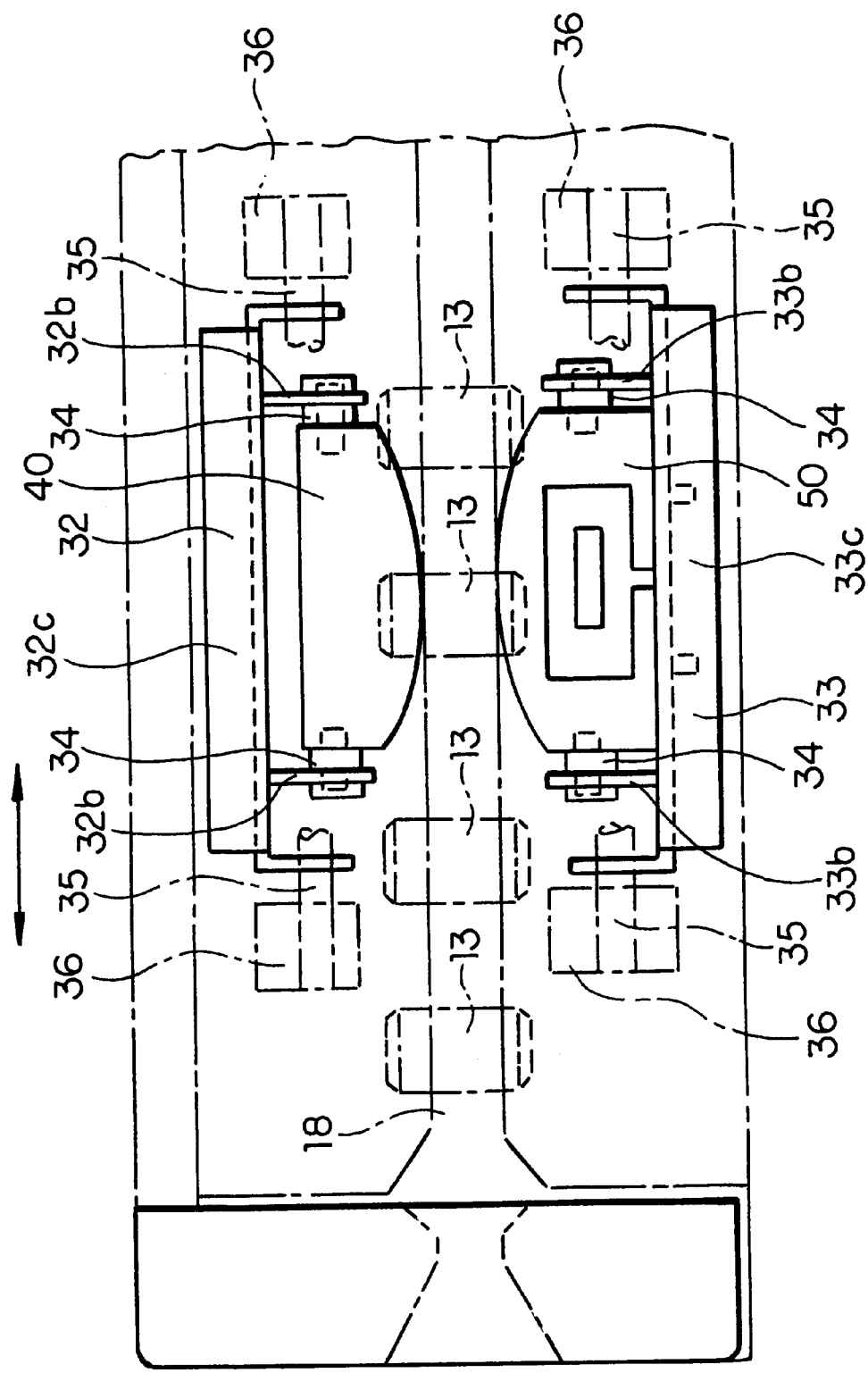
FIG. 9 is a side view of the head support mechanism shown in FIG. 8.

Magnetic heads 40, 50 are arranged on the upper and lower sides of card driving path 18 as shown in FIGS. 8 and 9. In this embodiment, upper head 40 is for a 1-track magnetic strip; lower head 50 is for a 3-track magnetic strip. However, the present invention is not limited to these. Different types of magnetic heads can be used to meet the different specifications of magnetic strips, of course. Also, it is acceptable that each magnetic head 40, 50 performs at least one of the recording or reproducing functions.

Figure 6:
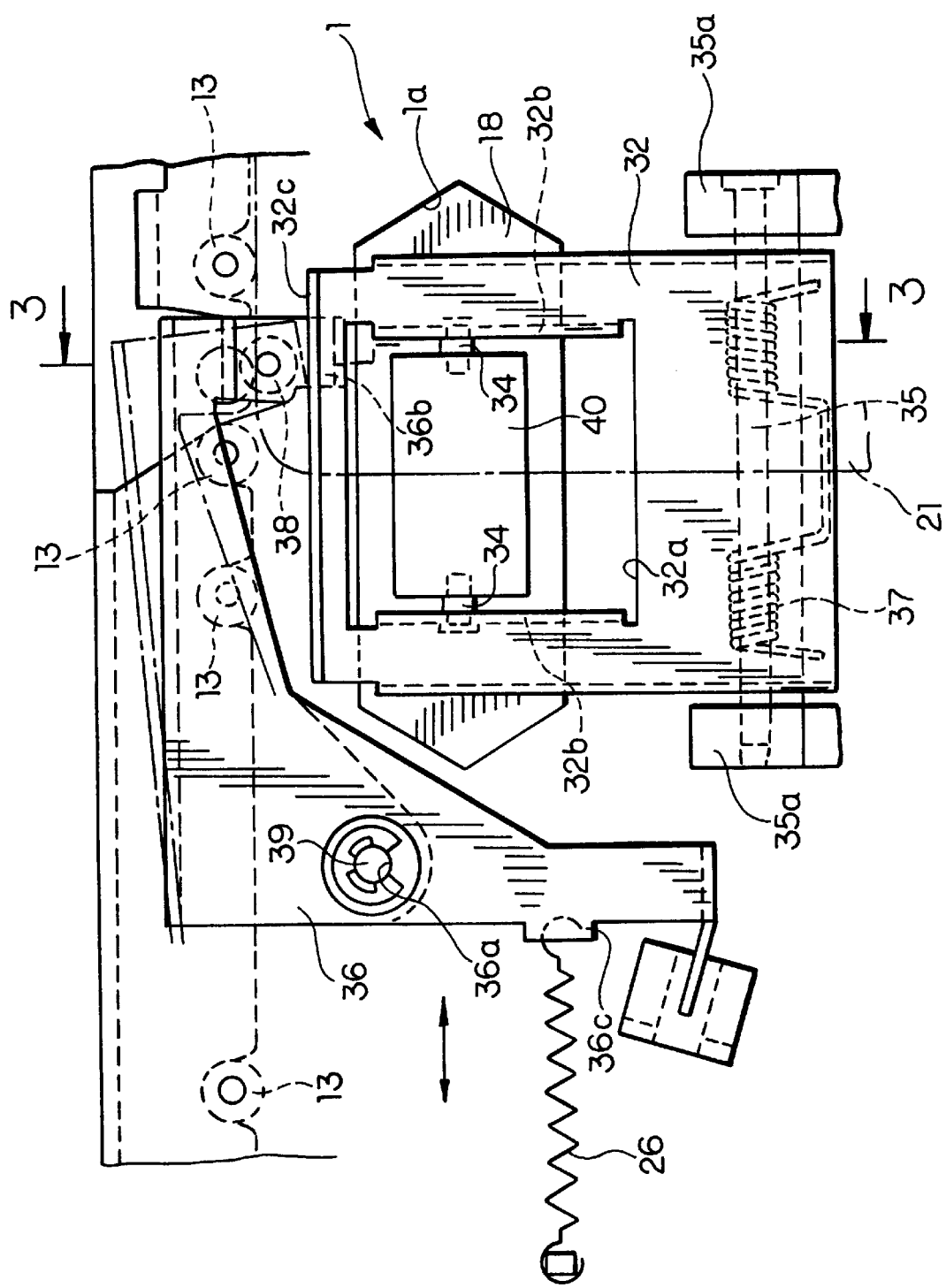
FIG. 6 is a plan view showing a head support mechanism of a card reader of the present invention.
Figure 10:
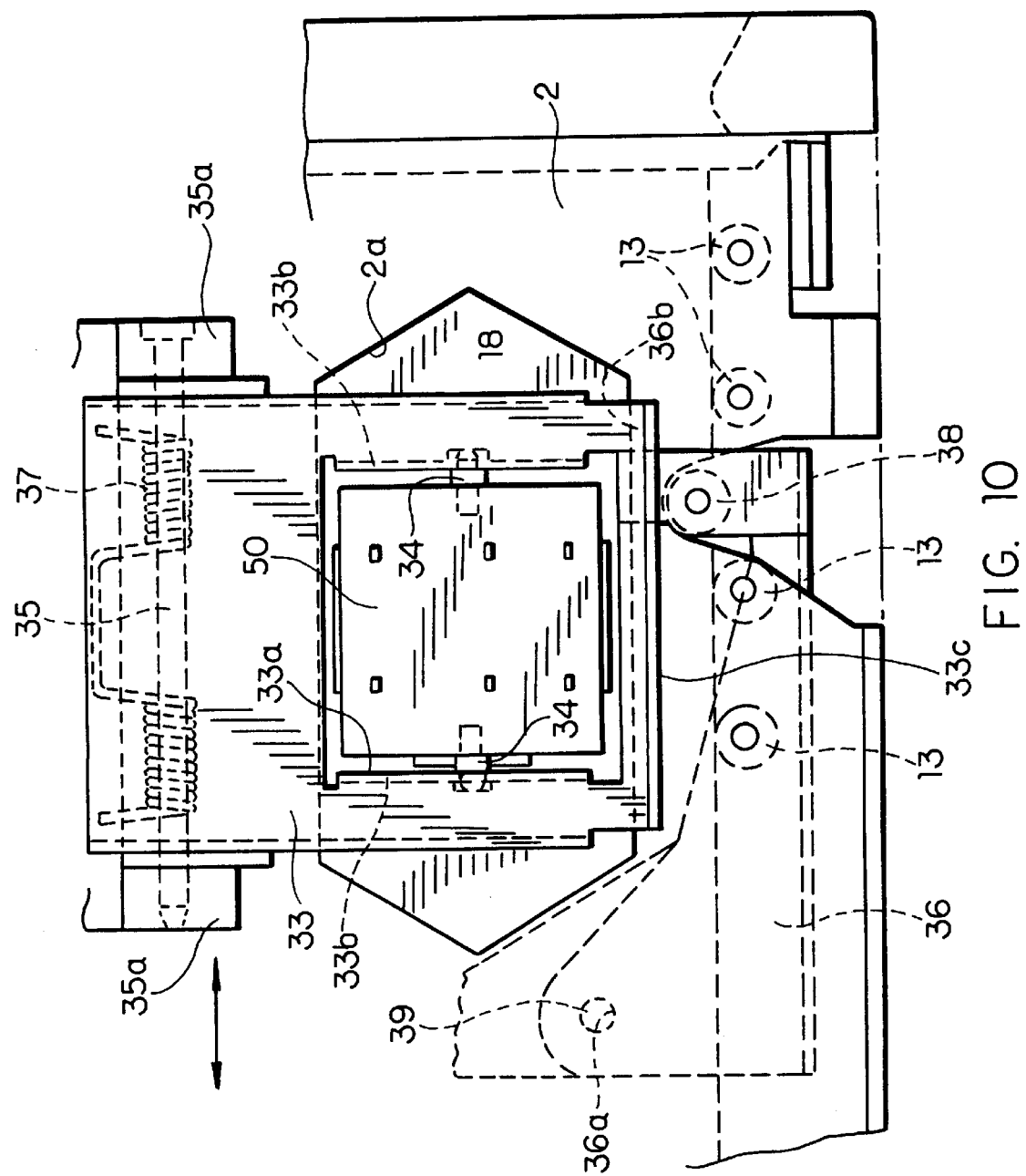
FIG. 10 is a bottom view of showing the support mechanism of the lower magnetic head shown in FIG. 8.

Upper and lower magnetic heads 40, 50 are supported by upper and lower support plates 32, 33, as shown in FIGS. 6 and 10, which are movable around axis 34 and shaped in square whose longer side is laid along the card driving direction. Upper support plate 32 is arranged opposite card driving path 18 of upper guiding frame 1; lower support plate 33 is arranged opposite card driving path 18 of lower guiding frame 2. In the middle of upper and lower support plates 32, 33, head windows 32a, 33a constructed with through holes. At both ends of each head windows 32a, 33a, flanges 32b, 33b projects above the side of card driving path 18. Upper and lower magnetic heads 40, 50 are movably mounted on flanges 32b, 33b of upper and lower support plates 32, 33 around shaft 34.

Upper and lower support plates 32, 33 are movably supported by upper and lower guiding frames 1 and 2 around shaft 35, 35 which are shaped in square with a long side laid along the card driving direction. Both ends of shaft 35, 35 are supported by shaft support blocks 35a, 35a molded onto upper and lower guiding frames 1, 2. Shaft 35, 35 is wound with spring 37 made of a coil spring. Spring 37, 37 transmits force from support plates 32, 33 such that magnetic heads 50 project into card driving path 18. Therefore, when external force does not operate on upper and lower support plates 32, 33 and upper and lower magnetic heads 40, 50, the head surfaces of upper and lower magnetic heads 40, 50 contact each other within card driving path 18 or face each other at a distance via contact limiting means which upper and lower magnetic heads 40, 50 are equipped with. In accordance with the present invention, it is not required that spring 37 is so strong as to correct the waves or warps of a card by pressing against the magnetic heads. Instead, it is sufficient that spring 37 "drag" the card (i.e., follows the curvature of the card) by contacting the card with its head surface as the card is driven. This configuration reduces friction between the head surface and card 21.

Opposite of where springs 37, 37 of upper and lower support plates 32, 33 are installed, lever bearings 32c, 33c, which are curved in the direction away from card driving path 18, are formed. Lever bearings 32c, 33c limit the movement position for support plates 32, 33 by contacting limiting lever 36. In the present invention, the projection position of magnetic heads 40, 50 to card driving path 18 is limited by lever bearings 32c, 33c of support plates 32, 33. However, the projection position to card driving path 18 can be limited by magnetic heads 40, 50 directly contacting limiting lever 36.

As shown in FIG. 6, limiting lever 36 is arranged at the side of upper support plate 32 of upper guiding frame 1. Limiting lever 36 is nearly L shape and comprises support portion 36a, which is the center of the curved movement of 36, a contact roller 38, which is mounted at one end as a contact portion, limiting portion 36b, which contact lever bearings 32c, 33c formed in the vicinity of contact roller 38; and a spring mounting portion 36c, which is formed on the other end. Support portion 36a is movably mounted onto shaft 39 which is perpendicular to the card surface and mounted on upper frame 1.

Contact roller 38, which is formed on limiting lever 36, is shaped such that its longer side is vertical to the card surface, comes in and out with respect to card driving path 18 as limiting lever 36 moves. Limiting portions 36b, 36b are positioned opposite card driving path 18 of upper and lower guiding frames 1, 2 and are shaped such that they are curved closer to card driving path 18. Therefore, limiting portion 36b, 36b can contact lever bearings 32c, 33c of each support plate 32, 33 as limiting lever 36 moves.

Also, one end of limiting spring 26, which is made of beli coil spring as a transmission member, is mounted at spring mounting portion 36c of limiting lever 36. The other end of limiting spring 26 is mounted on the upper guiding frame 1 at a point closer the away from the slot end. Limiting spring 26 rotates limiting lever 36 clockwise as shown in FIGS. 6 and 7 so that contact roller is projected into the card driving path; also, by pressing limiting portions 36b, 36b against lever bearings 32c, 33c, the projection position of magnetic heads 40, 50 is limited at the center of card driving path 18. At this projection position, it is ideal that magnetic heads 40, 50 are somewhat distanced while the end surfaces of magnetic heads 40, 50 are close together.

How card reader records/reproduces on card 21 is described herein.

Before card 21 is inserted, as shown in FIGS. 6 and 7, limiting lever 36 is rotated clockwise by limiting spring 26. Contact roller 38 projects to card driving path 18 and limiting portions 36b, 36b are pressed against lever bearings 32c, 33c. For this reason, as shown in FIG. 8, upper and lower support plates 32, 33 cannot move with respect to card driving path 18, and at the same time, the head surfaces of magnetic heads 40, 50 are positioned where the head surfaces and the card surface correspond to each other, that is, the neutral position.

By inserting card 21, a card transfer mechanism is driven as previously described and card 21 is taken further on belt 6, which is a card transfer means.

Next, the tip of card 21 contacts contact roller 38. By this, contact roller 38 retreats from card driving path 18 by resisting limiting spring 26. Limiting portions 36b, 36b are distanced from support plates 32, 33, thus movement of support plates 32, 33 are set free.

At the same time, the tip of card 21 contacts the head surfaces of magnetic heads 40, 50. Therefore, at the projection position of magnetic heads 40, 50, limited at the center of card driving path 18, the magnet heads are parted in a range which ensures the contact between the magnetic heads and the card, even when the tips of magnetic heads 40, 50 need to be somewhat distanced.

Card 21 is guided along the head surface to enter the gap between upper and lower magnetic heads 40, 50, thus expanding heads 40, 50 while the card is being driven. At this time, magnetic heads 40, 50 are pressed against card 21 via springs 37, 37, thus ensuring the contact between the magnetic strip and the head surface. Magnetic data are read/written when the magnetic strip and the head surface contact while card 21 is being driven.

Figure 12:
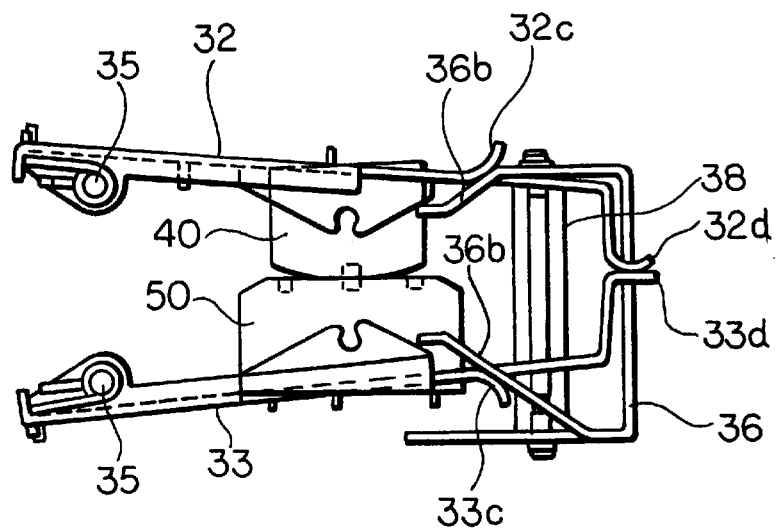
FIG. 12 is a side view showing another embodiment for the head support mechanism of two magnetic heads.

The present embodiment describes an example in that the head surfaces contact each other at the neutral position before card 21 is inserted. The embodiment is not limited to this. As shown in FIG. 12, the tips of support plates 32, 33 can be extended to form head contact limiting portions 32d, 33d such that head contact limiting portions 32d, 33d contact before card 21 is inserted. A contact limiting means can be formed for maintaining magnetic heads 40, 50 at a neutral position at which heads do not contact each other.

As described above, if head contact limiting portions 32d, 33d are designed to keep their tips away form each other, even in the state card 21 is not present, when the card is off the magnetic heads, which is provided with a small area of contact for head contact limiting portions 32d, 33d, which makes them extremely easier to return to the neutral position from the upper or lower position of card driving path 18, by limiting lever 36.

Next, when card 21 reaches the end of the path, the tip of card 21 is detected by insertion detection sensor 110 as shown in FIG. 7. By this, the card transfer mechanism is stopped or reverse rotated to exit card 21. When card 21 is ejected from the card reader, contact roller 38 can project to card driving path 18, thus, moving limiting lever 36 by limiting spring 26. Along with this operation, limiting portions 36b, 36b are pressed by each support plates 32, 33 to set magnetic heads 40, 50 to the neutral position.

Note that some cards are warped or curved. When inserting a warped card 21 into the card reader of this embodiment, magnetic heads 40, 50 move against support plates 32, 33 and support plates 32, 33 move against frames 1, 2, thus the head surface can conform the card surface. For this reason, even if a deformed card 21 is used, reading/writing of data can be performed highly accurately.

Figure 11:
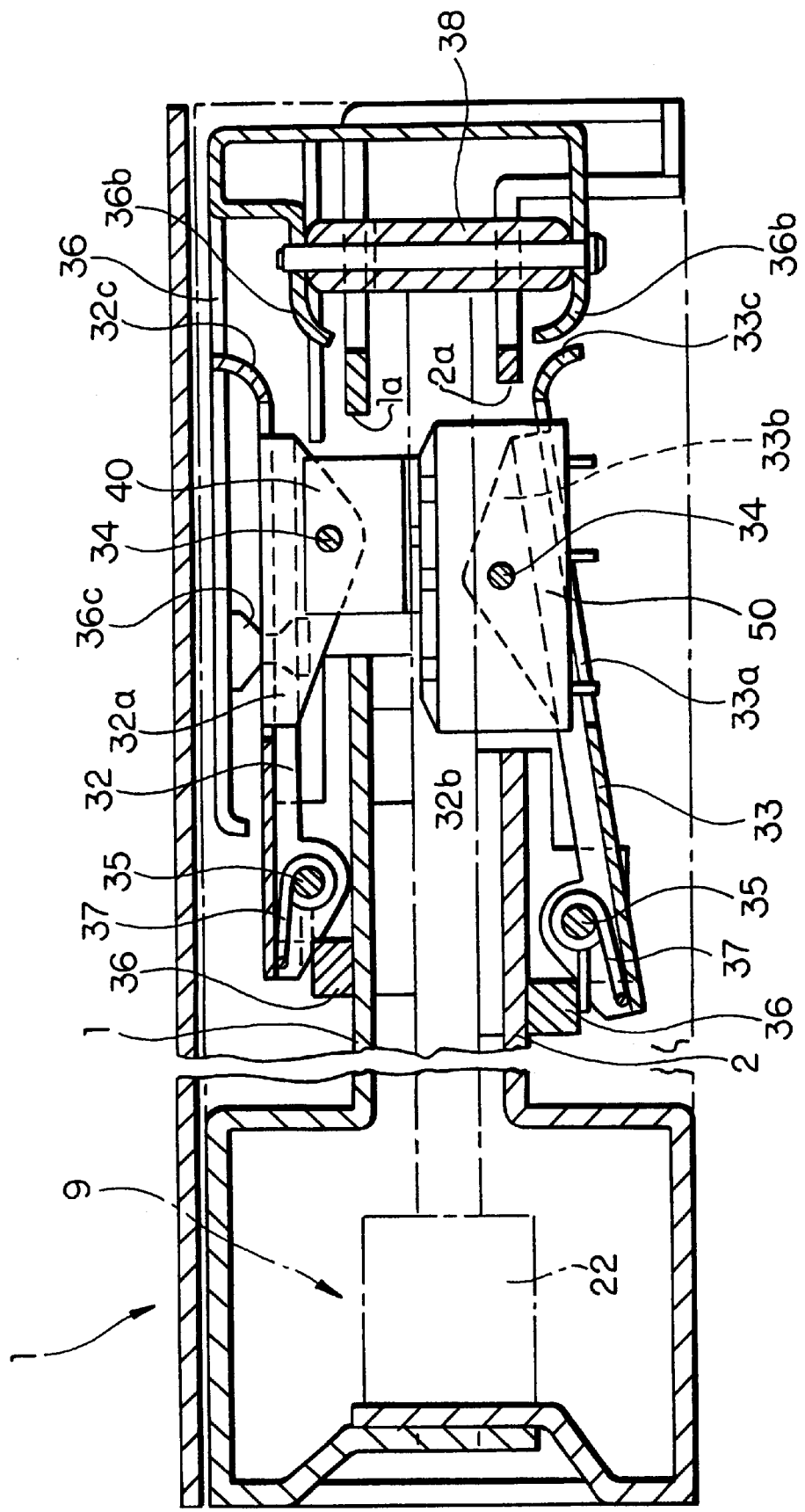
FIG. 11 is a vertical cross section showing a state in which two magnetic heads are displaced.

Also, as shown in FIG. 11, when deformed card 21 is ejected, magnetic heads 40, 50 may deviate from the center. This is because the head surfaces contact and are pressed by spring 37, having the head surfaces abrade each other; the heads keep their deviated positions. However, in this embodiment, limiting portions 36b, 36b move to contact lever bearings 32c, 33c; this sets supporting plates 32, 33 and magnetic heads 40, 50 to the center.

Therefore, according to this embodiment, limiting portions 36b, 36b are shaped to curve closer to card driving path 18; lever bearings 32c, 33c are shaped to curve away from card driving path 18. Even if support plate 32, 33 are largely deviated from the center, limiting portions 36b, 36b move to press one of the curvatures of lever bearings 32c, 33c with limiting portions 36b, 36b on one side, support plates 32, 33 can return to the neutral position. With this recovery, magnetic heads 40, 50 are kept at a distance. The tip of card 21 inserted into the card reader contacts the side surfaces of magnetic heads 40, 50, thus maintaining a smooth driving of card 21.

As shown in FIG. 11, when the head surfaces of magnetic heads 40, 50 contact each other and are deviated from the neutral position, the head surfaces of magnetic heads 40, 50 must be slid in the direction of the longer side of the contact surfaces to retain their neutral positions. As shown in FIG. 12, the magnetic heads can be returned to their neutral positions extremely easy using limiting lever 36 if the head surfaces of magnetic heads 40, 50 are set such that they do not contact while head contact limiting portions 32d, 33d are set to contact, and the area of contact is made small for head contact limiting portions 32d, 33d.

Also in this embodiment, both magnetic heads 40, 50 can be moved in the yawing and the card surface direction; they can contact card 21 even more closely; this makes it possible to read/ write magnetic data accurately.

Figure 13:
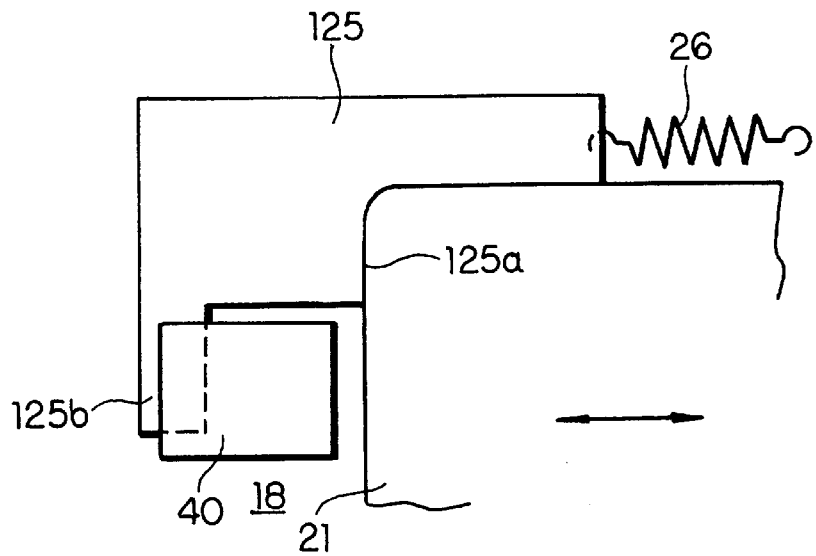
FIG. 13 is a plan view showing another embodiment for the position guiding member for a magnetic head.
Figure 14:
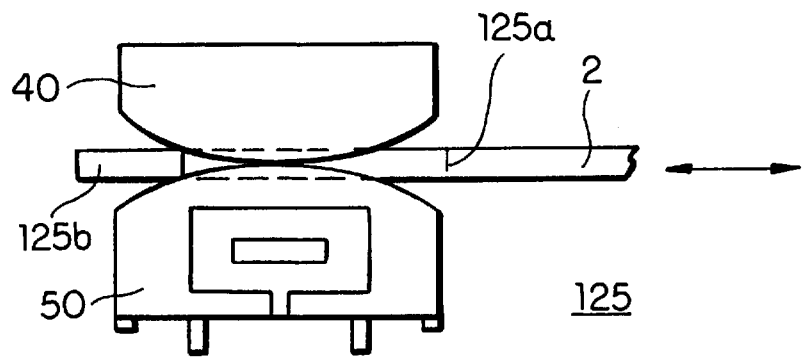
FIG. 14 is a side view of FIG. 13.

Note that, in the above embodiment, limiting lever 36 is used as a limiting member which yaws. However, movable lever 125, as shown in FIGS. 13 and 14, which is movable in the card driving direction can be used. In this case, contactingly movable lever 125 comprises contacts portion 125a which contact the tip of card 21 and limiting portion 125b which enters between the head surfaces of upper and lower magnetic heads 40, 50. In addition, a limiting spring made of helicoid spring 26' is attached on a part of contactingly movable lever 125. Note that in this embodiment, the structure of upper and lower magnetic heads 40, 50 or support plates 32, 33 or guiding frames 1, 2 and the like are the same as the above embodiment, therefore, is not described herein.

In this embodiment, limiting portion 125b is entered between head surfaces using the force transmitted from limiting spring 26' to set magnetic heads 40, 50 in the middle. Then, card 21 is inserted and contact portion 125a is pushed and limiting portion 125*b* is pushed out of magnetic heads 40, 50. When card 21 is ejected, limiting portion 125*b* again enters between magnetic heads 40, 50 to set them in the center.

Even when a deformed card 21 is used, when card 21 is ejected, limiting porion 125*b* sets magnetic heads 40, 50 in the center. Therefore, this embodiment also suggests that magnetic heads 40, 50 of the present invention in a largely deviated state can smoothly drive the next card that is inserted. Also, all of the above embodiments have magnetic heads 40, 50 at the sides of card driving path 18. However, the present invention is not limited to this. Magnetic heads can be installed only on one side. In this case, nothing will need to be formed opposite of the magnetic head over card driving path 18, but a pad roller may be arranged thereon.

Next, a card reader with a mechanism for handling an IC card, in which the IC contact block is lowered in accordance with the present invention, is described.

Figure 15:
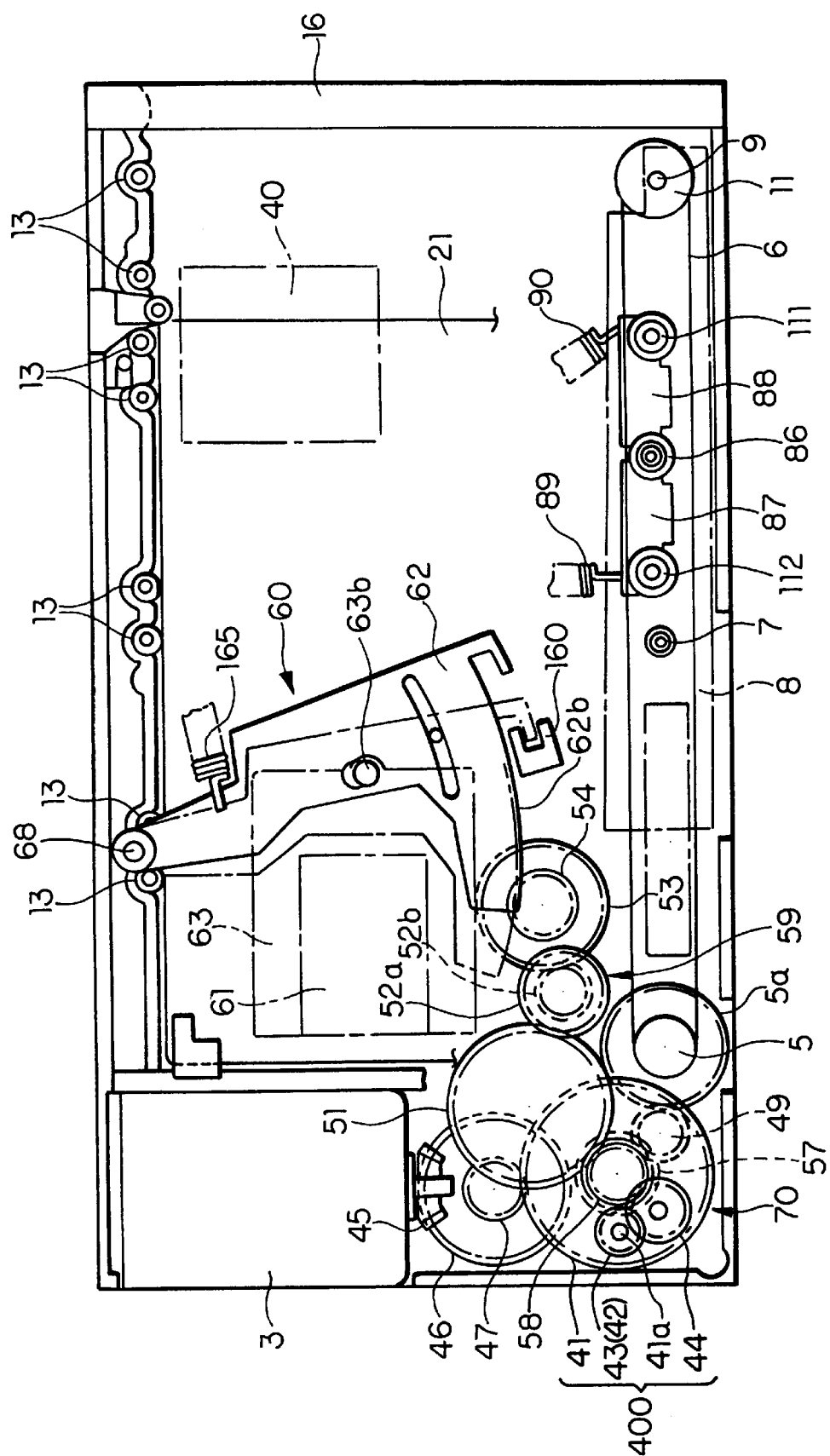
FIG. 15 is an overall configuration including the IC contact block of a card reader of the present invention.

In FIG. 15, card 21 is transferred from card insertion slot 16 to where data is read/written using the rotational (driving) force of motor 3. Data is read/written by contacting IC contact 610 (See FIG. 17,) which is held by IC contact block 61 formed on an IC terminal exposed manner on card 21. This embodiment includes a card transfer means by belt 6, which transfers card 21 between card insertion slot 16 and read/write position; and a contact block moving means 60, which moves IC contact block 61 between the contact position and the retreat position.

The load torque which is required for moving IC contact block 61 to the contact point with card 21 is set larger than that which is required for moving belt 6, which is the load torque of transfer means for the transfer of card 21, and is smaller than that which is required when the card 21 is inserted into the read/write position which is the end of its movement. At the same time, a driving force switching mechanism 70 is formed for transmitting rotational force of motor 3 to the side where each load torque is smaller.

Note that in this card reader, data is read/written while card 21 is being transferred between a magnetic strip on card 21 and magnetic heads 40, 50, which are formed in the middle of card driving path 18, which is made up of lower guiding frame 2 and upper guiding frame 1.

Card transfer means comprises four pulleys 5, 11, 111, 112 and drive belt 6 which is held by each pulley. Pulley 5 transmits the rotational force of motor 3 which is transmitted from drive force switching mechanism 70 via gear 49 to drive belt 6. Pulley 11 is mounted at the tip of arm 8 which is rotatable around shaft 9; driving belt 6 is pressed onto one end of card 21 by being stretched in counterclockwise by spring 17 (See FIG. 1.) Pulleys 111, 112 are mounted at the tip of rotatable arms 87, 88 around shaft 86. They are pulled by each of springs 89, 90 to press drive belt 6 against one end of card 21. Drive belt 6 is the same as in the previous embodiment in that it transfers card 21 from card insertion slot 16 to the read/write position by pressing card 21 against eight rollers 13, which makes a card reference plane.

Figure 16:
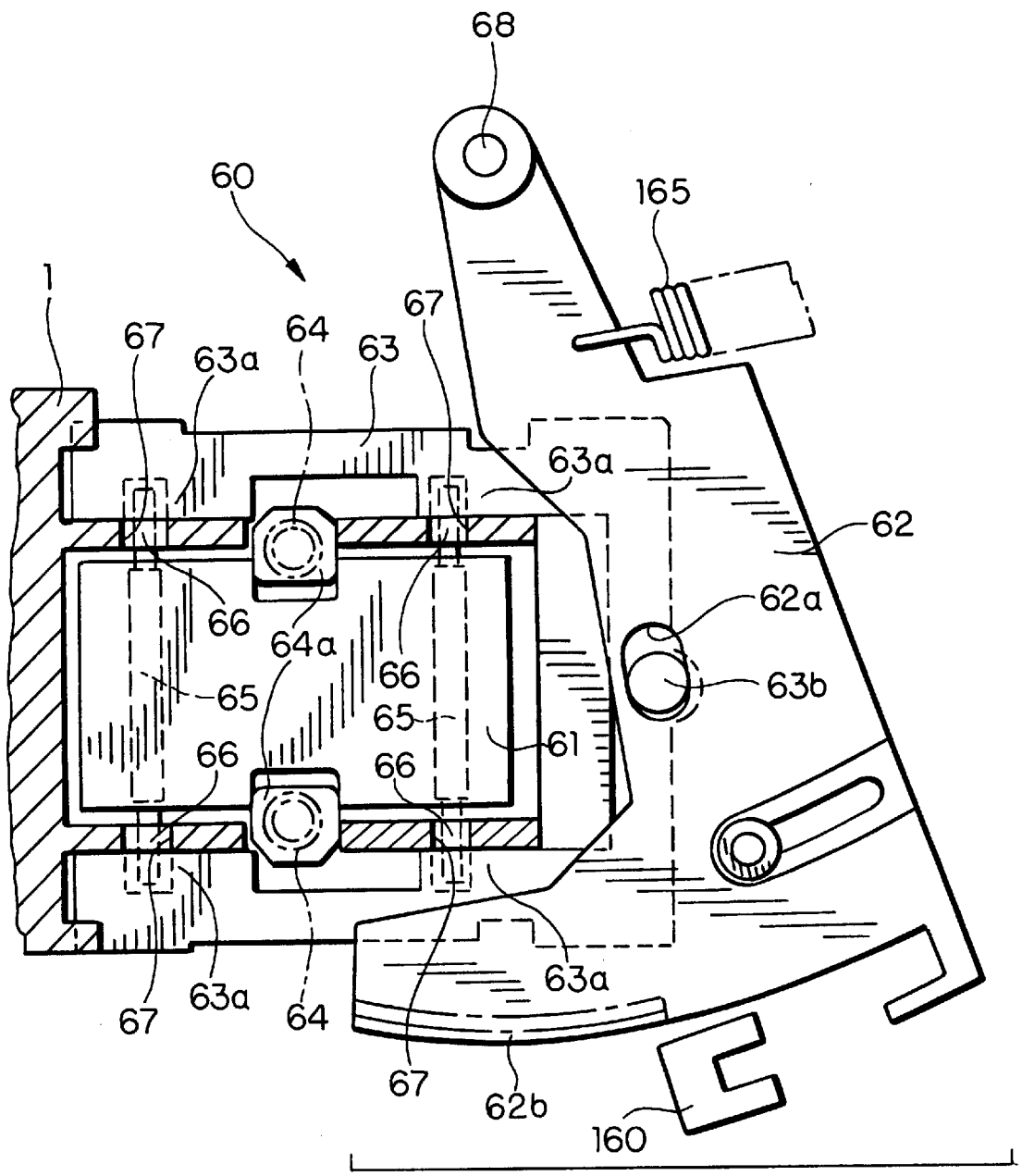
FIG. 16 is a magnified diagram for an IC contact block moving means shown in FIG. 15.

Contact block moving means 60, as shown in FIG. 16, includes an arm 62, which is rotatable within a range of predetermined angles, a cam lever 63, which moves IC contact block 61 from the retreat position from card driving path 18 to the contact point with the card, two return coil springs 64, which return the IC contact block 61 from the contact position to the retreat position.

Note that the above contact position (position indicated with a double-dotted line in FIG. 17) is where IC contact 610 of IC contact block 61 resiliently contacts the IC terminal exposed on card 21. The retreat position (position indicated with a solid line in FIG. 17) is where IC contact 610 is apart from the IC terminal, which opens a way for transferring card 21.

Two shafts 65 are fitted through IC contact blocks 61. Each shaft 65 supports four pairs of IC contacts 610 of a resilient spring structure. Sleeve 66 is rotatably fitted onto both ends of each shaft 65. Each sleeve 66 is inserted into U groove 67 formed on upper guiding frame 1. Therefore, IC contact block 61 can move only in the depth direction of each U groove, that is in the direction vertical to the moving direction of card 21.

Figure 17:
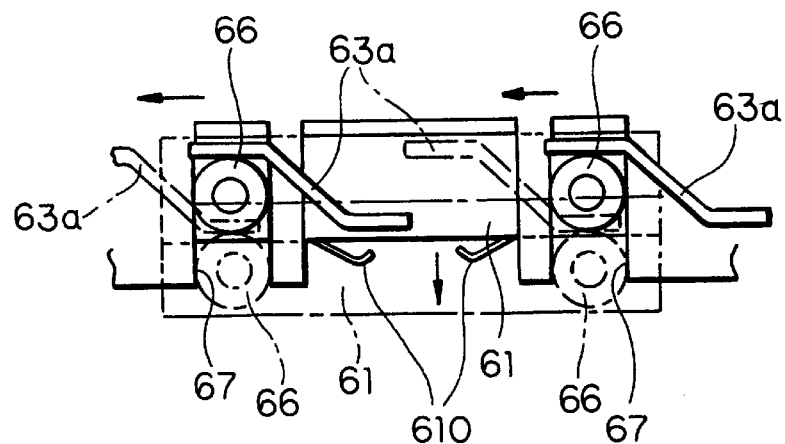
FIG. 17 is a schematic configuration describing the IC contact block movement shown in FIG. 16.

Around IC contact block 61, that is outside each U groove 67, cam lever 63 is shaped nearly a rectangle with an open side. Cam lever 63 is held on upper guiding frame 1 in the transfer direction of card 21 slidably at a predetermined distance. Cam portion 63*b* is formed at four places opposite each sleeve 66 of cam lever 63. Therefore, if cam lever 63 slides, each sleeve 66 is pushed down toward the opening of U grooves as shown in FIG. 17. In other words, IC contact block 61 is moved to the contact position.

Each return spring 64 is arranged in the state in which they are compressed between spring base 64*a*, 64*a* formed in the center of both ends of IC contact block 61 and upper guiding frame 1. Therefore, each return spring 64 pushes each sleeve 66 up toward the bottom of each of the U grooves 67. In other words, if the pressure from cam lever 63 is released, IC contact block 61 is moved to the retreat position.

A long hole 62*a* is formed in the center of arm 62. Convexity 63*b* formed on cam lever 63 is inserted into the long hole 62*a*. Therefore, if arm 62 is rotated around shaft 68, cam lever 63 slides. At the tip surface of arm 62, gear portion 62*b* is formed. Gear portion 62*b* is engaged with a small gear 54 of deceleration gear train 59. Therefore, if second output gear 58 of drive switch mechanism is rotated, the rotation is transmitted to gear portion 62*b* via large gear 51, gear 52*a,* small gear 52*b,* gear 53, and small gear 54 of deceleration gear train 59. Arm 62 is rotated by these gears.

In other words, if a rotational force of motor 3 is transmitted to second output gear 58, arm 62 rotates clockwise in FIG. 15. Cam lever 63 is moved to the contact position by sliding IC contact block 61. On the other hand, if a rotational force of motor in the refers direction is transmitted, arm 62 rotates counterclockwise in FIG. 15. Cam lever 63 is returned and IC contact block 61 is moved to the retreat position.

One end of coil spring 165 is positioned at a predetermined position on arm 62; the other end of coil spring 165 is mounted on upper guiding frame 1. Coil spring 165 pulls arm 62 in the direction apart from IC contact block 61. The load torque, which works on contact block moving means 60, is increased when IC contact block 61 is moved to the contact position; it is decreased when IC contact block 61 is moved to the retreat position. In other words, the load torque, which is required to move contact block 61 to the contact position, is set larger than that is required for transferring card 21 and set smaller than that is required when card 21 is at the read /write position, which is the end of movement. Also, the load torque which is required for moving contact block 61 to the retreat position is set smaller than that is required for transferring card 21 by adjusting the magnitude of force of coil spring 165.

Note that in the vicinity of arm 62, photo sensor 160 is installed. This photo sensor 160 detects the fact that arm 62 is rotated to the contact position with IC contact block 61.

Figure 18:
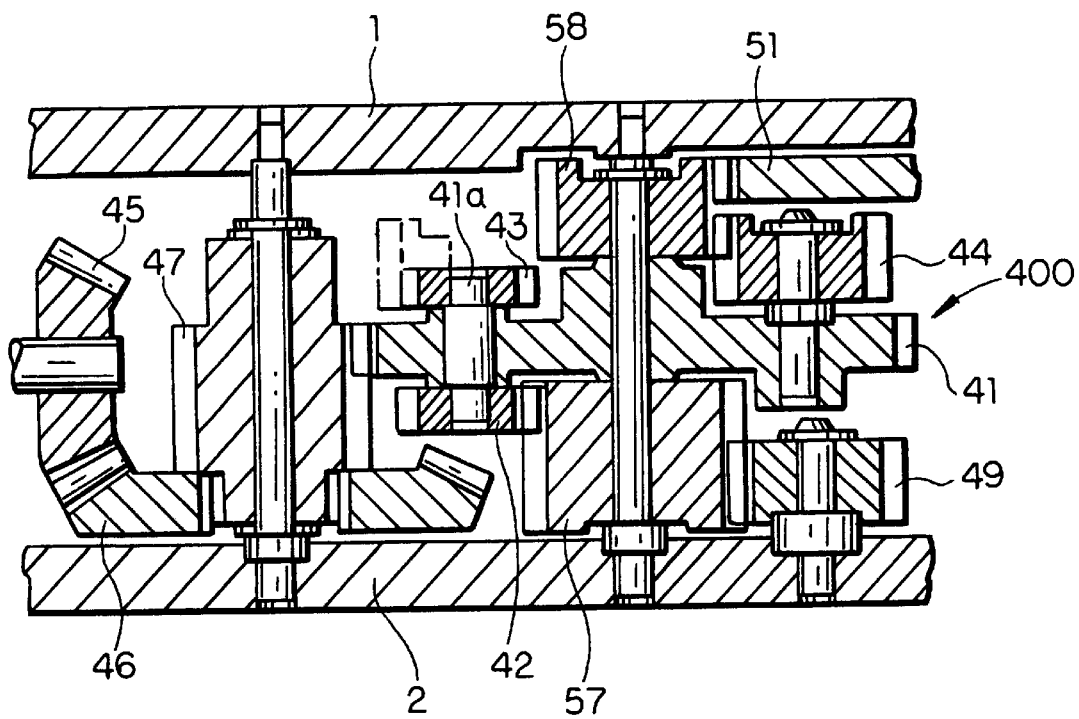
FIG. 18 is a extended diagram of FIG. 15, in which gears convert the driving forces of a card reader shown in FIG. 15.

Driving force switching mechanism 70 is a gear connection mechanism including first output gear 57 and second output gear 58 which transfer the rotational force of motor 3 to contact block moving means 60. Of the first and second output gears 57, 58, the output gear with a larger load torque is stopped, thus the output gear with a smaller torque is rotated. This gear connection mechanism comprises, as shown in FIG. 18, driving force division gear unit 400 arranged relatively rotatably on the same shaft between the first and second output gears 57, 58.

Driving force division gear unit 400 includes driving gear 41, which is rotated by motor 3, revolving shaft 41*a*, which is fitted through the eccentric position of driving gear 41 and is relatively rotatably mounted at the eccentric position, first division gear 42, which is fixed at one end of revolving shaft 41*a*; and second division gear 43, which is fixed on the other end of the revolving shaft 41*a*.

First division gear 42 is engaged with first output gear 57 side. In other words, it is acceptable if first division gear 42 is engaged with first output gear 57 directly or indirectly. In this embodiment, first division gear 42 directly transmits the rotational force for engagement with first output gear 57. On the other hand, second division gear 43 is engaged with second output gear 58 side. In other words, it is acceptable that second division gear 43 is engaged with the side of second output gear 58 directly or indirectly. In this embodiment, second division gear 43 transmits the rotational force for indirect engagement with second output gear 58 via pinion gear 44. Pinion gear 44 is installed relatively rotatably at the eccentric position of drive gear 41 in the same manner as second division gear 43. Note that in FIG. 18, second output gear 58 and pinion gear 44 are apart; they are illustrated that way to simplify the drawing. However, they are engaged in actual use.)

Rotational force of motor 3 is transmitted to drive gear 41 via umbrella gear 45, large gear 46, small gear 47 respectively. If drive gear 41 is rotated, each division gear 42, 43 and pinion gear 44, which are installed at the eccentric position of drive gear 41, revolve around each output gear 57, 58. First output gear 57 transmits the rotational force to the card transfer means. It receives a predetermined load torque when the card reaches the read/write position, that is, the transfer end position of card 21 as shown in FIG. 15. Also, second output gear 58 transmits the rotational force to contact block moving means 60. It receives the load torque which is required for moving contact block 61. The power relationship between each load torque is set by adjusting the speed ratio of the gear train of the card transfer means side to the contact block moving means 60 side and adjusting the spring force of coil spring 65 of contact block moving means 60. In other words, the load torque which is required to move contact block 61 is set significantly smaller than that is required when card 21 is at the read/write position, which is the end of the path. Note that umbrella gear 45 is fixed onto output shaft of motor 3. Also, large gear 465 and small gear 47 are a composite gear which rotates integrally.

The operation of the IC card reader will now be described. First, when card 21 is inserted into card insertion slot 16, the sensor detects card 21, rotating motor 3. The rotational force of motor 3 is transmitted deceleratingly to drive gear 41 via umbrella gear 45, large gear 46, small gear 47 respectively. Therefore, each division gear 42, 43 begins to rotate around each output gear 57, 58.

Now, the load torque which is required to move IC contact block 61 is set larger than that required for transfer of card 21. In other words, the minimum value for the load torque while IC contact block 61 moves is larger than the maximum value of the load torque required for transfer of card 21. Second output get 58 receives a larger load torque than first output gear 57.

For this reason, second output gear 58, which receives a larger load torque, is stopped; pinion gear 44, which revolves second output gear 58, and second division gear 43 revolve. Therefore, first division gear 42, which is connected to second division gear 43 by revolving shaft 41*a* revolves; first output gear 57 which is engaged with first division gear 42 rotates.

In other words, if drive gear 41 rotates and first and second division gears 42, 43 revolve around first and second output gears 57, 58, of these first and second output gears 57, 58, second division gear 43, which is engaged with second output gear 58 side and is stopped due to receiving a larger load torque, revolves. This revolution is transmitted to the other first division gear 42 via revolving shaft 41*a* to rotate first output gear 57 which receives a smaller load torque from first and second output gears 57, 58.

The rotational force of first output gear 57 is transmitted to gear 49 of card transfer means. It rotate belt 6 by rotating pulley 5 via gear 5*a*. By doing so, card 21 which is inserted into card insertion slot 16 is taken into the card reader as card 21 is pressed onto each rollers 13 to be transferred to the read/write position. Card 21 is transferred smoothly while it is transferred a power relationship between the load torque which is required to move IC contact block 61 and load torque which transfers card 21 is maintained. The rotational force of motor 3 is transmitted only to the card transfer means side. In other words, the rotational force is not transferred to moving means 60 until card 21 is transferred to the read/write position. The card transfer means is driven only.

On the other hand, if card 21 reaches to the read/write position, which is the end of the path, card transfer load temporarily increases. It exceeds IC contact block moving load. In other words, the load torque which is larger than that required for moving IC contact block 61 is generated on the card transfer means side. For this reason, unlike the above mentioned case, first output gear 57 receives a larger load torque than second output gear 58. First output gear 57 is stopped at this time and first division gear 42 which revolves around first output gear 57 revolves. Therefore, second division gear 43, which is connected to first division gear 42 via revolving shaft 41*a* revolves, rotating second output gear 58 which is engaged with first division gear 42.

In other words, when drive gear 41 rotates and first and second division gears 42, 43 rotate around first and second output gears 57, 58, of first and second output gears 57, 58, first division gear 42, which is engaged with the side of first output gear 57, revolves. First output gear 57 is stopped when receiving a larger load from one of them. This rotation is transmitted to second division gear 43 via revolving shaft 41*a*. Second output gear 58, which receives a smaller load torque from one of first and second output gears is rotated via pinion gear 44.

The rotational force of the second output gear is transmitted to large gear 51 of contact block moving means 60. Then, it is deceleratingly transmitted to gear 52*a*, small gear 52*b*, large gear 53, and small gear 54 respectively. Arm 62 is driven in this way. Cam lever 63 is slid to move IC contact block 64 to the contact position with card 21. When photo sensor 66 detects that IC contact block 64 reached the contact position, that is, arm 62 is moved to a predetermined position, rotation of motor 3 is stopped. In this state, "detent" torque works on motor 3. Arm 62 will not be retracted by coil spring 165. IC contact block 61 is held at the contact position of card 21.

To complete reading/writing data and to eject card 21, motor 3 is rotated reversely. Now when card 21 is ejected, coil spring 165 works in returning direction of arm 62. The load torque which second output gear 58 receives becomes significantly smaller than that which first output gear 57 does. Therefore, the reversed rotational force is transmitted to contact block moving means 60 side via second output gear 58. Before card 21 ejection process begins, IC contact block 61 is moved to the retreat position first.

Note that the fact that the reading/writing of magnetic data is performed while card 21 is being transferred is the same as conventional technology.

When IC contact block 61 reaches the retreat position, then, the load torque which second output gear 58 receives becomes significantly larger than that first output gear 57 receives. Therefore, the reversed rotational force of motor 3 is transmitted to card transfer means side via first output gear 57 to eject card 21.

Note that in the above description, arm 62 of contact block moving means 60 and cam lever 63 are independent. They can be integrated, of course.

Also, rotational force between motor 3 and drive force division gear unit 400, between first output gear 57 and second output gear 58, and between second output gear 58 and arm 62 pulley are transmitted using a flat gear or an umbrella gear. However, other deceleration transmission methods such as worm gears or belts and the like can be used as well.

Figure 19:
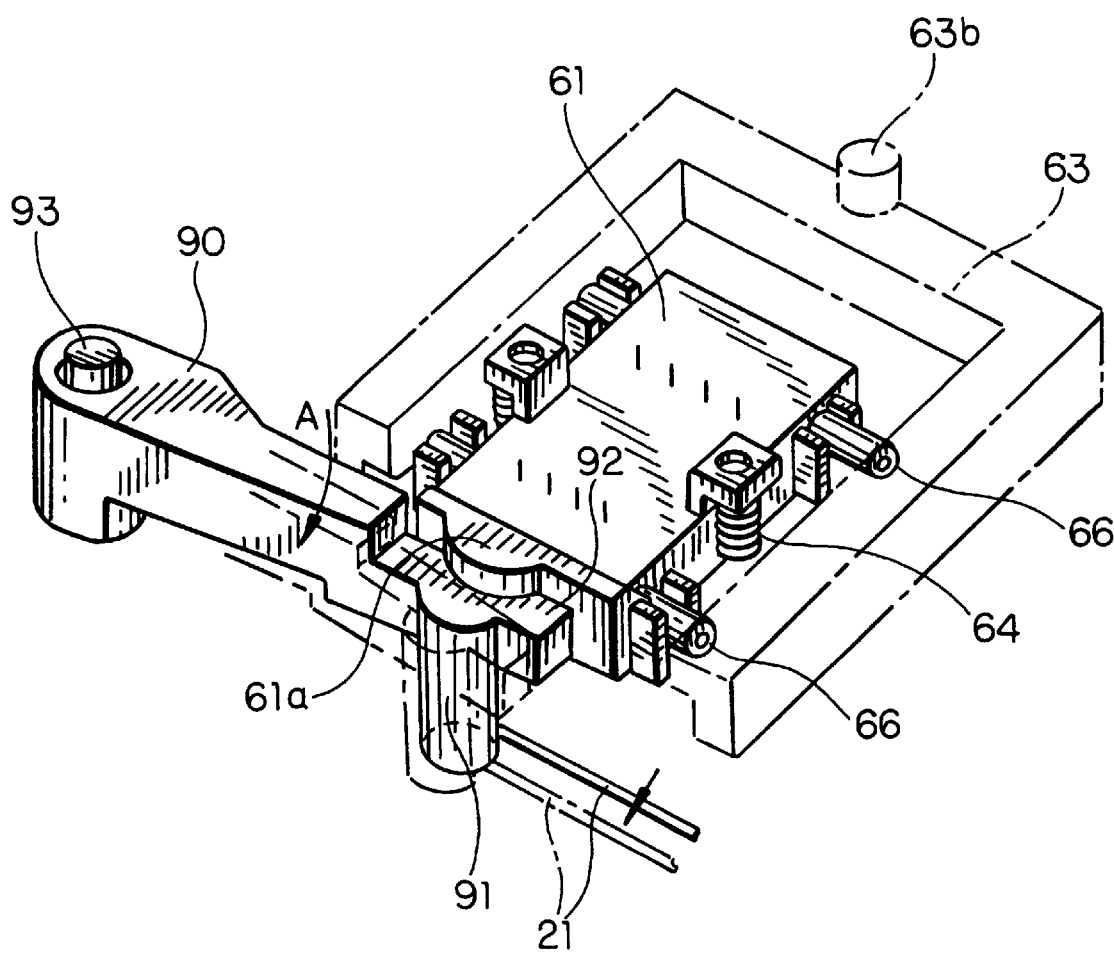
FIG. 19 is a descriptive diagram showing another embodiment for the IC contact block movement.

Next, another embodiment in which card transfer and IC contact block movement switching, that is when an IC contact block contacts the IC terminal when the card is transferred to a predetermined position, as ensured is shown in FIG. 19.

In the Embodiment of FIG. 19, unlike that of FIG. 16, projection portion 61a is formed at IC contact block 61. A movement prevention member 90 is formed to prevent the above the IC contact block 61, which is engaged with projection portion 61a, is moved from the retreat position, which is away from card driving path 18, to the contact point with IC terminal formed on card 21. Movement prevention member 90 is movably installed onto support shaft 93 formed on a guide frame. It is engaged with the front end of card 21 and comprises card engagement portion 91, which is moved by the above card 21. When card 21 is inserted into a predetermined position, for example, to the read/write position defined by IC contact, projection portion 61a formed on IC contact block 61 is off engagement flat plane 92 of movement prevention member 90 thus enabling its moving into the above contact position of IC contact block 61. Note that card engagement portion 91 of movement prevention member 90 is formed to cross card driving path 18. Therefore, it is pressed by the front end of card 21. By forming movement prevention member 90, IC contact block can move to the contact position with the IC terminal of the card when the card is transferred to the read/write position. Also, by installing inserted sensor 110 in the deepest part of the slot, specifically at the read/write position, to detect the insertion by the movement of moving prevention member 90, inserted sensor 110 can be formed at an appropriate place away from card driving path.

In addition, in the above description, by forming magnetic head 40 in the middle of card driving path, the IC card reader is used for the magnetic card reader as well. However, magnetic head 40 can be omitted and the card reader can be used specifically for IC cards.

As explained above, in a card reader of the present invention, a pressing member, which contacts a side of a card such that the card is pressed against a card driving reference plane, is positioned between a card insertion slot and a recording/reproducing means such as a head and the like. Consequently, the card is driven while being pressed against the card driving reference plane by the pressing member, which results in straightening the direction of the card immediately after insertion; hence, the direction of the card can be corrected in a short driving distance. This enables one to shorten the overall length of the card reader and to reduce the size of the card reader.

When a rotation member, which can be rotated by a motor activated by insertion of the card, is employed as the above pressing member, pressing and driving of the card can be simultaneously performed by the rotation member; therefore, the structure of the card reader can be further simplified.

In addition, in the use of a magnetic card, the structure of the card reader can be such that when the magnetic card is ejected and does not contact a magnetic head, a limiting member is positioned at a limiting position at which projection of the magnetic head in a card driving path is limited, and when the magnetic card is inserted and contacts the magnetic head, the limiting member is retreated from the limiting position.

As a result, the head surface of the magnetic head is positioned at a neutral position even after a deformed card is ejected; thus, it is unnecessary to correct the deformed card with the pressure inserted from the magnetic head. In turn, the head pressure can be reduced, therefore, an increase in the size of a motor which drives the card, caused by an increase in the load of driving the card, can be prevented.

Furthermore, in the use of an IC card, a driving force switching mechanism is formed between a motor and, a card transfer means and a contact block moving means. It enables to transmit the rotational force of the motor to the card transfer means or the contact block moving means according to the correlation in the amount of the load torque affecting the card transfer means and the contact block moving means.

Therefore, both transferring the card and driving the IC contact block can be separately performed by one motor; by reducing the number of components, in turn, low cost and minimizing the size of the apparatus can be accomplished.

While the foregoing description and drawings represent the preferred embodiments of the present invention, it will be readily appreciated by those of ordinary skill in the art that various changes may be made without departing from the spirit and scope of the invention. Therefore, it is intended that the appended claims be interpreted as including the embodiments described herein, the alternatives mentioned above, and all equivalents thereto.

What is claimed is:

1. A card reader, comprising:

a card insertion slot for receiving a card having data stored thereon;

card transfer means for transferring said card from said card insertion slot along a card driving path, said card transfer means having a length in a direction of a thickness of a card which is longer than that of the thickness of a card, said card transfer means being driven by a motor and being in contact with an edge of said card when the card is received;

read/write means, disposed at a position of said card driving path, for reading and writing data from and to at least one surface of said card, said at least one surface being on a plane perpendicular to a plane on which said edge of said card is disposed; and pressing means, disposed between said card insertion slot and said read/write means, for contacting said edge of said card and pressing said card against a card driving reference plane, said card driving reference plane being parallel to said plane on which said edge of said card is disposed, said pressing means being a rotatably supported rotating member, wherein said edge of said card being pressed by said pressing means and being contacted by said card transfer means is different from said at least one surface of said card from which data is read and to which data is written.

2. The card reader of claim 1, wherein said rotating member is driven by a motor located at one end of said card driving path; and said card driving reference plane includes a plurality of rollers on which said card rolls as said card is transferred by said card transfer means.

3. The card reader of claim 2, wherein said read/write means is a magnetic head; and said rotating member is a belt that contacts the edge of said card, said belt being held by a transmission pulley arranged between said card insertion slot and said magnetic head for transmitting a force to press the edge of said card, and a driving pulley rotatably driven by said motor.

4. The card reader of claim 3, wherein said rotating member includes a transfer pulley for pressing said belt onto the edge of said card, said transfer pulley being positioned between said transmission pulley and said driving pulley.

5. The card reader of claim 1, wherein said card is a magnetic card; and said read/write means includes a magnetic head, said magnetic head transmitting a force projectingly over said card driving path on which said magnetic card is driven, said magnetic head being movably supported in a direction orthogonal to a surface of said magnetic card; wherein said magnetic card is positioned at a limited position, by limiting an amount of projection of said magnetic head over said card driving path, when said magnetic card is not contacting said magnetic head; and said magnetic card is moved away from said limited position by a limiting member when said magnetic card contacts said magnetic head.

6. The card reader of claim 5, wherein said limiting member comprises:

a contact portion which contacts said card; and a limiting portion which contacts said magnetic head or a support plate which supports said magnetic head; wherein when said limiting member is at said limited position, said contact portion is positioned within said card driving path and, at the same time, said limiting portion limits the amount of projection of said magnetic head over said card driving path;

said card reader also comprising a transmission member which transmits force to said limiting member to limit the amount of projection of said magnetic head over said card driving path.

7. The card reader of claim 5, wherein said read/write means includes two magnetic heads arranged at the sides of said card driving path; and said limiting member limits the amount of projection of said magnetic heads at the sides.

8. The card reader of claim 7, wherein said magnetic heads at the sides are displaced from one another when an amount of projection of said magnetic heads is limited by said limiting member.

9. The card reader of claim 8, wherein said magnetic heads are displaced from one another by means of making said support plates contact each other.

10. The card reader of claim 5, wherein magnetic heads are arranged at the sides of said card driving path; and said limiting member includes a contacting portion which contacts said card; and a limiting portion which contacts said magnetic head or support plates which support said magnetic heads at the sides; wherein said contact portion, when said limiting member is at said limited position, is positioned within said card driving path, and at the same time, said limiting portion is formed to limit the amount of projection of said magnetic head over said card driving path while said magnetic heads are apart from each other; and said magnetic heads further include a transmission member which transmits force from said limiting member to make said contact portion contact said card.

11. The card reader of claim 10, wherein said contact portion is formed in the vicinity of said magnetic head.

12. The card reader of claim 1, wherein said card is an IC card having an IC terminal thereon; and said read/write means is an IC contact block including an IC contact for contacting said IC terminal; said card reader further comprising:

contact block moving means for moving said IC contact block from a contact position, at which said IC contact is contacting said IC terminal, to a retreated position, at which said IC contact is not contacting said IC terminal;

wherein a load torque required to move said IC contact block to said contact position is set larger than a load torque required for transferring said IC card by said card transfer means; and is set smaller than a load torque required for transferring said IC card when the position of said IC card is limited to a position at which said read/write means reads or writes data from or to said IC card;

said card reader further comprising a driving force switching mechanism for switching a rotational force of said motor to one of said card transfer means and said contact block moving means having the smaller load torque.

13. The card reader of claim 12, further comprising a movable stopper, engaged with said IC contact block, for preventing said IC contact block from moving from said retreated position to said contact position; said movable stopper including a card engagement portion engaged with said IC card to be transferred and which moves along said IC card; wherein said IC contact block moves to said contact position by said movable stopper as said card engagement portion is moved by said IC card.

14. The card reader of claim 13, wherein said card engagement portion of said movable stopper is formed to cross said card driving path and is pressed by a front edge of said IC card.

15. The card reader of claim 12, wherein said driving force switching mechanism is a gear connected mechanism comprising:

a first output gear which transfers a rotation force of said motor to said card transfer means;

a second output gear which transfers said rotation force to said contact block transfer means; and one of said first and second output gears which is loaded with a larger load torque is controlled to stop, and the other of said first and second output gears is controlled to rotate.

16. The card reader of claim 15, wherein said gear connected mechanism further includes a driving force dividing gear unit, which is rotatably arranged between said first and said second output gears on a same shaft thereof; said driving force dividing gear unit comprising:

a driving gear which is rotated by said motor;

a revolution shaft which passes through an eccentric position of said driving gear and is rotatably mounted at said eccentric position;

a first division gear which is fixed at one end of said revolution shaft and is engaged with said first output gear side; and a second division gear which is fixed at the other end of said revolution shaft and is engaged with said second output gear side;

wherein when said driving gear rotates to revolve said first and second division gears around said first and second output gears, one of said division gears which engages with one of said first or said second output gear, which is stopped because it has a larger load torque than the other, rotates, and the rotation is transmitted to the other division gear to rotate one of said first or second output gear with a smaller load torque than the other.

17. A card reader, comprising:

a card insertion slot for receiving a card having a magnetic strip thereon;

card transfer means for transferring said card from said card insertion slot along a card driving path;

a magnetic head for reading data stored on said magnetic strip of said card, said magnetic head located above a read position of said card driving path;

bias means for biasing said magnetic head in a direction towards a surface of said card, said surface having said magnetic strip thereon; and head movement limiting means for establishing a predetermined minimum distance of said magnetic head above said card driving path when said card is not located at said read position along said card driving path at which said card can be read by said magnetic head; said head movement limiting means not establishing said predetermined minimum distance when said card is located at said read position.

18. The card reader of claim 17, further comprising a second magnetic head for reading data stored on a second magnetic strip of said card, said second magnetic head located below said read position of said card driving path; and second bias means for biasing said second magnetic head in a second direction towards a second surface of said card having said second magnetic strip thereon; said second direction being opposite to said direction of bias of said first bias means; and wherein said head movement limiting means forces said first and second magnetic heads into respective neutral positions above and below said card driving path only when said card is not located at said read position.

19. A card reader, comprising:

a card reader insertion slot for receiving a card having data stored thereon;

card transfer means for transferring said card from said insertion slot along a card driving path, said card transfer means having a length in a direction of a thickness of a card which is longer than that of the thickness of a card, said card transfer means being driven by a motor;

read/write means, disposed at a position of said card driving path, for reading and writing data from and to said card; and a rotating member for inserting said card into said card driving path and transferring said card, disposed between said card insertion slot and said read/write means, which contacts the side surface of said card on a plane that is different than that on which the read/write means is working, said plane is perpendicular to the plane on which the read/write means is working, and said rotating member is driven by a motor; wherein said rotating member is located at the position which is out of said card driving path in the direction of the side surface of said card is rotatably holding the rotating axis of the plane which is perpendicular to the plane on which said read/write means is working, said card being transferred by said side surface of said card which is on a different plane than said plane on which the read/write means is working.

* * * * *